Jan. 9, 1951  M. P. LAURENT  2,537,470
GATE VALVE

Filed June 29, 1948  4 Sheets-Sheet 1

Inventor
Milton P. Laurent
By [signature]
Attorney.

Jan. 9, 1951 M. P. LAURENT 2,537,470
GATE VALVE
Filed June 29, 1948 4 Sheets-Sheet 2

Inventor
Milton P. Laurent
By
Attorney.

Jan. 9, 1951 M. P. LAURENT 2,537,470
GATE VALVE
Filed June 29, 1948 4 Sheets-Sheet 3
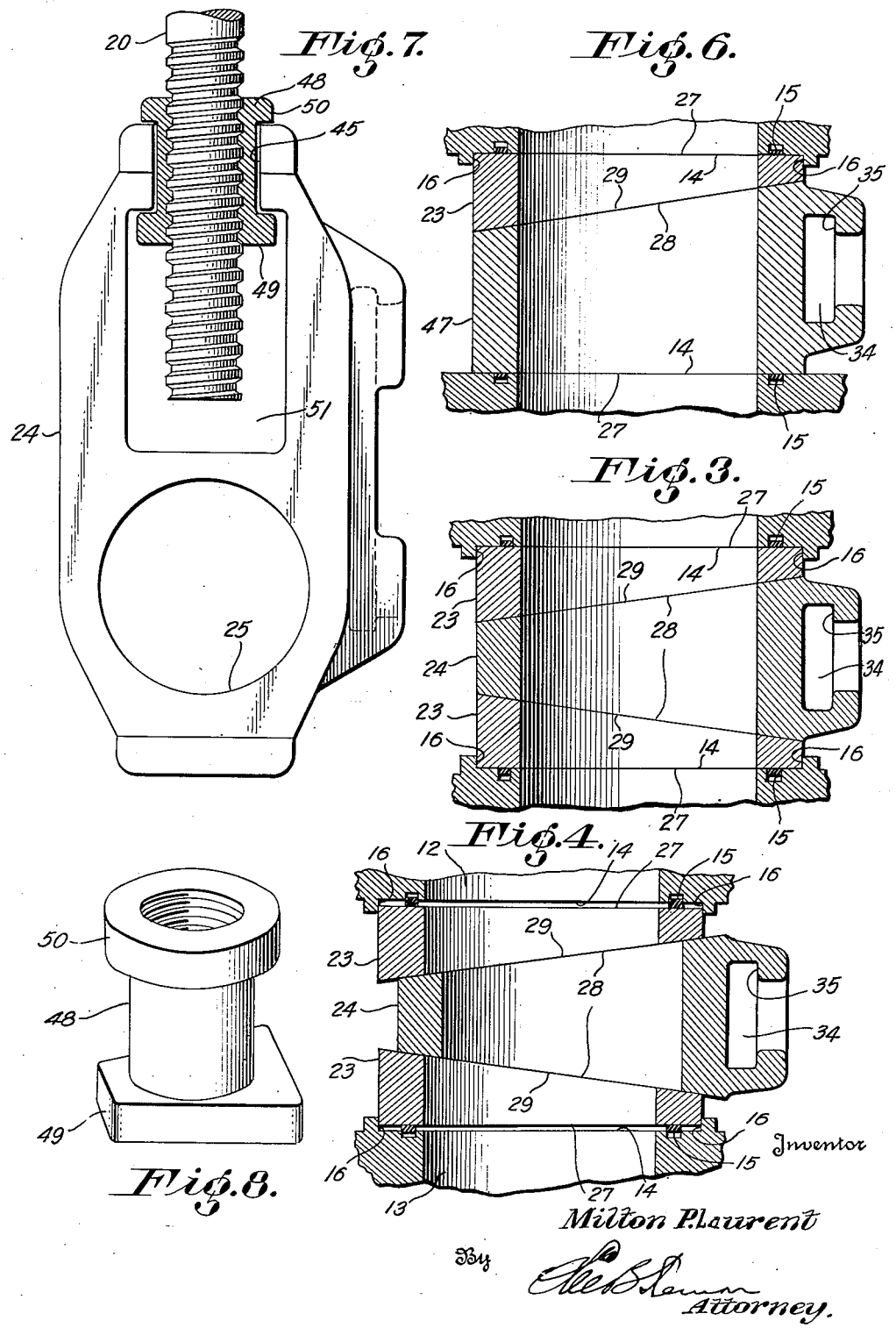
Inventor
Milton P. Laurent
By
Attorney.

Patented Jan. 9, 1951

2,537,470

UNITED STATES PATENT OFFICE 2,537,470

GATE VALVE

Milton Paul Laurent, Houston, Tex., assignor to W-K-M Company, a partnership

Application June 29, 1948, Serial No. 35,857

11 Claims. (Cl. 251—70)

This invention relates to a "through conduit" type of sliding gate valve. By the term "through conduit" is meant a valve which, in its open position, leaves the conduit entirely unobstructed to flow at the valve opening. Such gate valves usually are employed to control the flow in conduits carrying large volumes of fluids, such as gas or oil. The through conduit gate valve provided by this invention effectively controls the flow of fluids which may be at high temperature, high pressure, and/or of a corrosive nature. My improved valve serves under such difficult conditions not only without leakage, but also without undue wear of the sealing surfaces of the valve, thereby adding greatly to its service life.

Gate valves intended for use under these conditions frequently are provided with a ported gate of sectional or multi-part construction. The sectional valve gate has relatively movable sealing elements which are mechanically forced apart to seat oppositely against the valve seats that surround the ports in the valve housing. This expansion of the gate effects a tight seal between the gate and the valve seats when the valve is in either open or closed position.

In valves of known construction, the mechanical forces, which seat the gate elements, usually are provided by a wedging action between the separate sections of the gate. Such a wedging action takes place during the final movement of the gate, propelled by a conventional valve stem, into fully open or fully closed position. To unseat the gate sealing elements and permit the gate to be moved easily and freely between open and closed positions of the valve, springs usually are employed to contract the gate. Such springs are effective to contract the gate after the expanding forces have been relieved, i. e. after initial movement of the gate from the fully open or fully closed position. Contracting springs, however, are subject to breakage, are not necessarily positive in their action, and complicate the gate construction. In addition, spring contraction is not controllable to adjust the clearance between the gate sealing elements and their seats. Such controlled contraction and thereby clearance, is desirable in order to prevent excessive escape of lubricant from the valve housing into the line or conduit.

Contraction of the gate, upon relief of the expansive or seating forces, also is necessary to avoid a practical condition, known as pressure lock. Thus, if the valve is closed and sealed, and the fluid pressure within the valve housing is greater than the pressure on both sides of the line, the gate sealing elements are hydraulically held against their seats. Under this condition, if no means are provided to positively contract the gate elements, when the mechanical expansive forces are relieved, the hydraulic seating forces tend to bind or wedge, so to speak, the entire gate against movement. Such a bound state, known as pressure lock, often renders movement of the gate from closed to open position difficult to initiate.

Expansion of the gate during its final movement into open or closed position is objectionable, because such action results in a wiping or dragging effect between the sealing surfaces of the valve. A wiping action between the sealing surfaces of the gate elements and the valve seats, while such surfaces are in loaded contact, i. e. forcefully pressed together, causes rapid wear and sometimes galling of these accurately machined and highly polished surfaces. Leakage is the consequent result. Furthermore, sealing surfaces that undergo such wiping action must be formed of materials which resist the attendant wear. Such materials are not always those which provide an effective sealing surface or those which best endure the seating stresses without fracture.

Accordingly, it is an object of this invention to provide a gate valve having a sectional gate in which the movable gate elements seat and unseat, normally of the valve seats, after the gate has reached fully open or fully closed position. Hence, wiping action between loaded sealing surfaces of the valve is entirely avoided. The avoidance of such wiping action not only eliminates abrasive wear of the sealing surfaces, but also enables a much wider choice of materials for their construction.

Another object of this invention is to provide a gate valve of the type under consideration in which contraction of the gate is accomplished without the use of springs.

A further object of this invention is to provide a gate valve having a sectional gate that may be positively expanded or contracted, independently of the operation of the valve stem.

Still another object of this invention is to provide a gate valve of the type under consideration in which contraction of the gate is controllable to adjust the amount of clearance between the gate sealing elements and their seats.

Still another object of this invention is to provide a gate valve having a sectional gate that is provided with means for positively overcoming the adverse effects of a pressure lock condition.

A still further object of this invention is to provide a gate valve of sturdy construction which is especially adapted for long service and reliable under high pressure, high temperature, and/or corrosive conditions.

Other objects and advantages of the invention will be apparent from the following description and accompanying drawings in which:

Figure 3 is a fragmentary sectional view taken on line 3—3 of Figure 1.

Figure 4 is a fragmentary sectional view corresponding to Figure 3, but showing the gate elements unseated from the valve seats.

Figure 6 is a fragmentary sectional view corresponding to Figure 3 showing a modification of the invention.

Figure 7 is an elevational view, partly in section, of a modified form of the center section of the gate for use in a valve of the non-rising stem type.

Figure 8 is a perspective view of the bushing shown in Figure 7.

Figure 1:
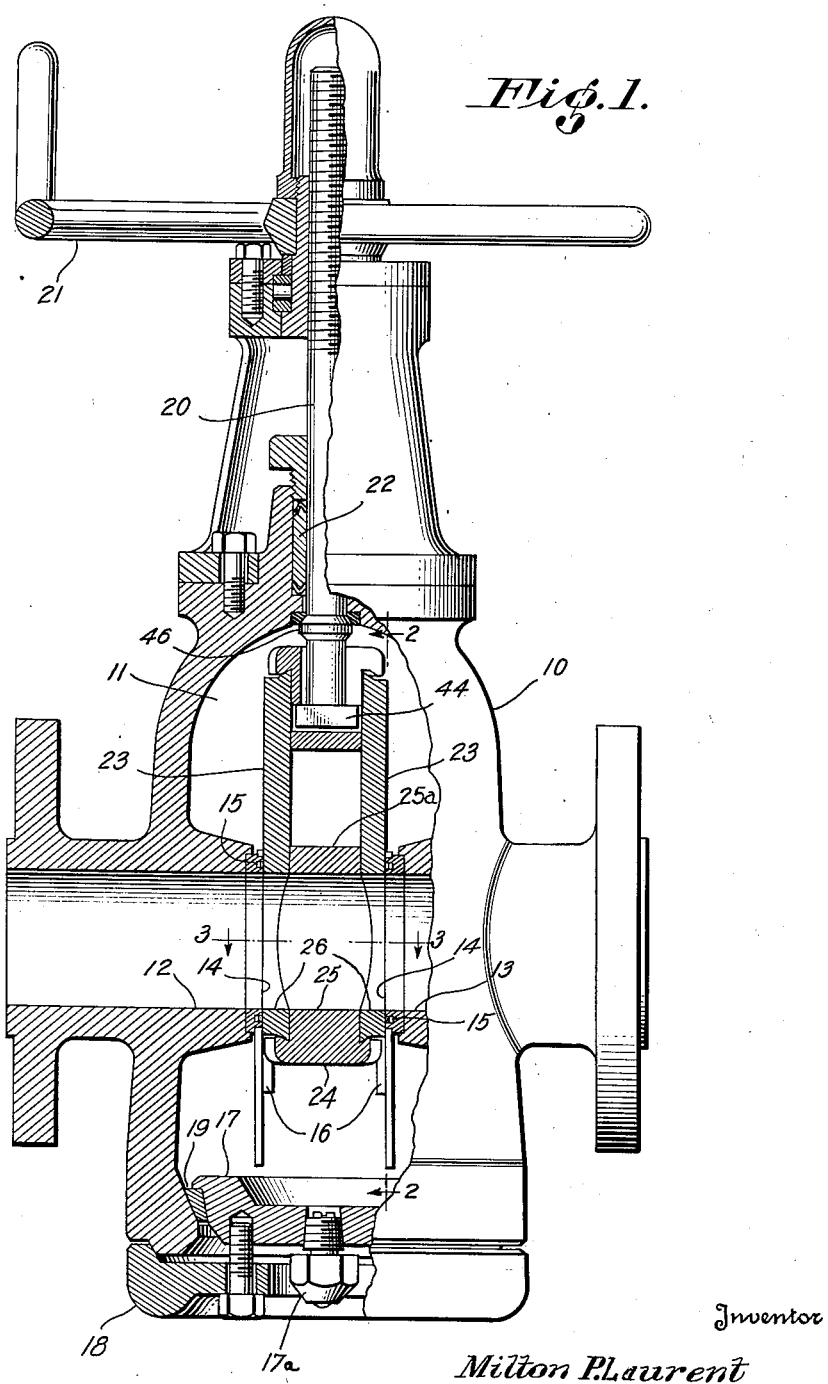
Figure 1 is a vertical view, partly in section, of a gate valve, of the rising stem type, embodying this invention. The valve is shown in open position and with the gate elements expanded into sealing engagement with the valve seats.
Figure 2:
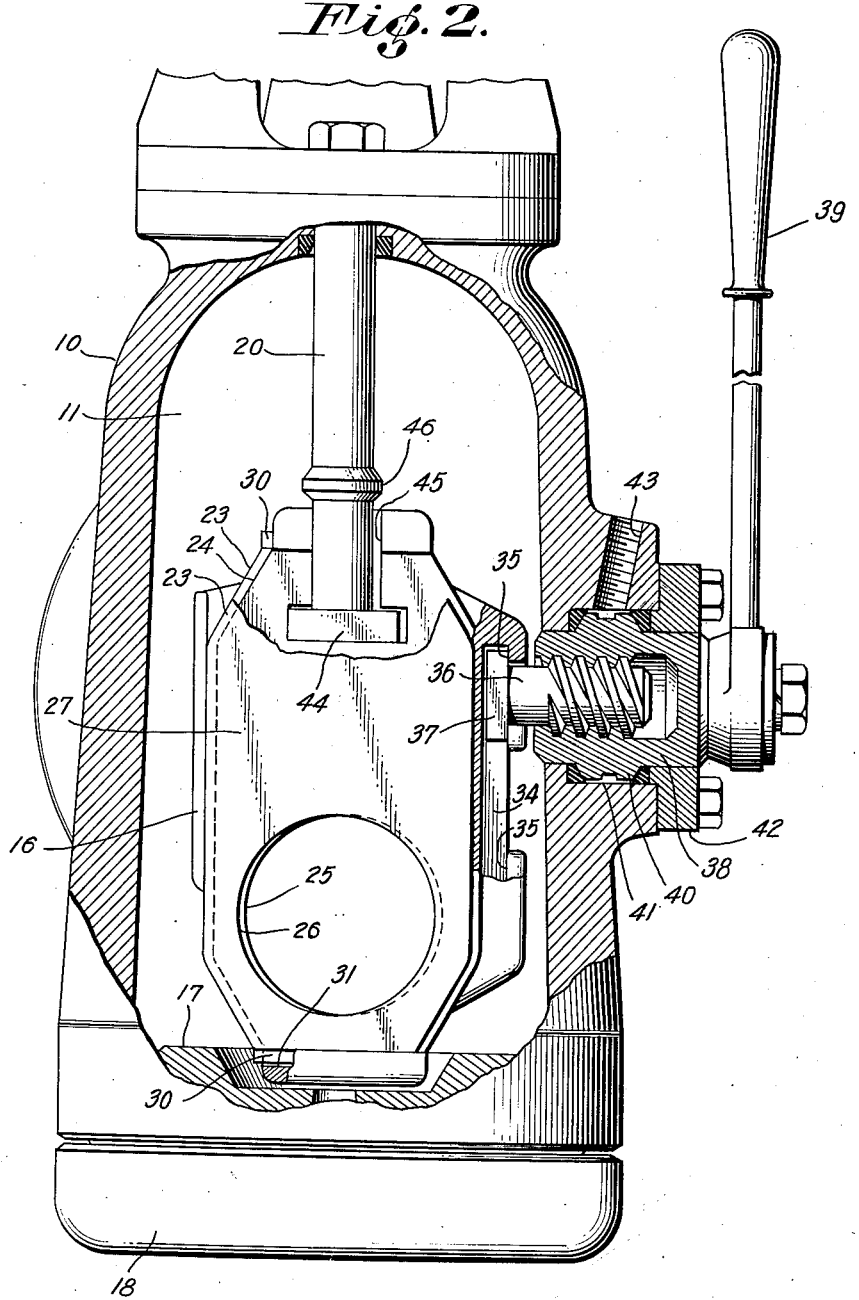
Figure 2 is a fragmentary view, partly in section, taken partially on a line corresponding to 2—2 of Figure 1, but showing the valve in closed position, and with the gate elements unseated from the valve seats.

Referring now to the drawings, Figures 1 and 2 show a through conduit gate valve, of the rising stem type, having a housing 10 provided with an interior chamber 11 in which is housed the gate mechanism of the valve. Aligned ports 12 and 13, formed in opposite walls of the housing 10, are provided with parallel, preferably removable, opposed valve seats 14, which may contain conventional sealing rings 15. The valve seats 14 have side flanges or guides 16 which, together with the seats 14, serve to guide and confine the gate to substantially rectilinear movement for opening and closing the valve. The chamber 11 is closed at its lower end by a closure plate 17 which is secured in place by an annular retaining member 18. A wedge-shaped sealing gasket 19 is interposed between the periphery of the plate 17 and the mouth of the chamber 11 to provide a pressure-responsive seal. A valve stem 20 having threaded engagement with a conventional handwheel 21 extends through a packing gland 22 at the upper end of the chamber 11. The stem 20 is non-rotatably connected to the gate, so that rotation of the handwheel 21 raises and lowers the stem 20 to thereby open and close the valve. A conventional pressure lubrication fitting 17a is threaded into the closure plate 17 in order to supply the chamber 11 with lubricant, usually grease, as is customary in valves of this type. The structure thus far described is known and, accordingly, no further detailed description is believed necessary.

Figure 5:
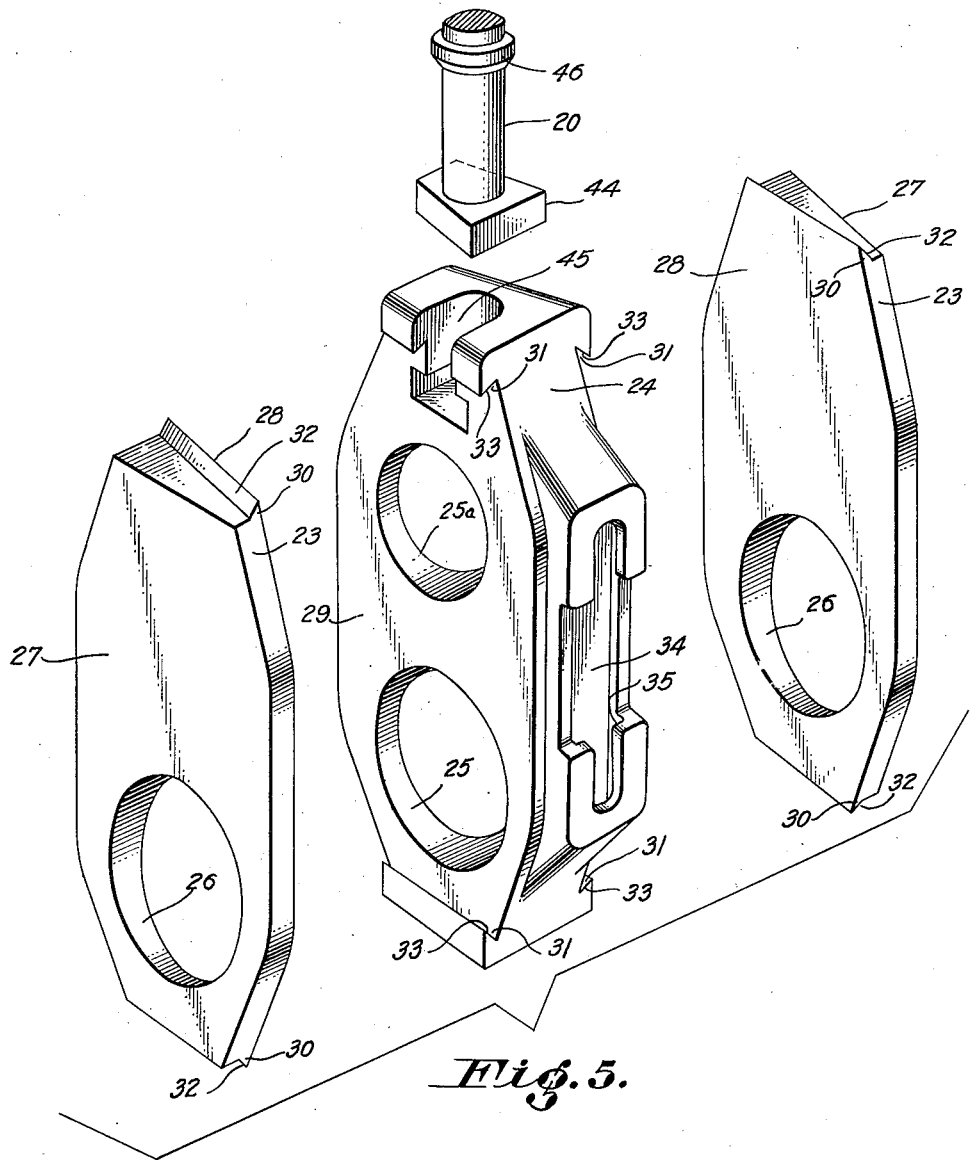
Figure 5 is an "exploded" perspective view of the component parts of the valve gate, and a portion of the valve stem embodying this invention.

The ported valve gate assembly which slides between the valve seats 14 in the guides 16 is formed in three sections, two outer segments 23, and an intermediate core 24, as best shown in Figure 5. The core and the segments have ports 25 and 26, respectively, which in the open position of the gate assembly, as shown in Figure 1, are aligned with the housing ports 12 and 13 to permit unobstructed passage of fluid through the valve. The core also may be cored out, as indicated at 25a, for weight reduction.

The gate when assembled is substantially rectangular in horizontal section, as shown in Figures 3 and 4, so that the flat parallel outer faces 27 of the segments 23 may sealingly engage the corresponding flat faced valve seats 14. It will be understood, however, that the sealing faces of the segments and the seats may be arcuate, or other suitable shape, in horizontal section. Such other shapes are possible of use, provided the corresponding sealing surfaces extend parallel to the direction of travel (i. e. endwise movement) of the gate. This surface orientation will permit movement of the gate between open and closed positions yet provide the desired sealing surfaces.

The inner faces 28 of the segments 23 diverge laterally of the gate, as best shown in Figures 3 and 4. The core 24 also has laterally divergent faces 29 each of which extends parallel to a corresponding face 28 of the segments. Hence, lateral displacement of the core 24 relative to the segments 23 in one direction (to the left in Figures 3 and 4) results in a mutual wedging action between the two sets of inner abutting faces 28 and 29 of the gate sections. This wedging action is effective to expand the gate normally of the valve seats 14. Such expansion is sufficient to force the outer faces 27 of the two segments 23 into tight sealing engagement with their respective valve seats 14. During expansion of the gate, the segments 23 are held against lateral displacement by the guides 16, so that the segments are forced to move and seat normally against the valve seats 14. Hence, no wiping action occurs between the seat and segment sealing surfaces, while such surfaces are being placed under the seating load. It also will be understood that, although the wedging surfaces of the core and segments are shown as flat, these surfaces may be of other suitable configuration, such as arcuate, in vertical section. Such other shapes are possible of use provided the opposed surfaces of each set are laterally parallel and the two sets of such surfaces are laterally divergent. This surface orientation will permit lateral dislacement of the core yet retain the desired wedging effect.

Both ends, i. e. the top and bottom, of each segment 23 are connected to the core 24 by a lip or rib 30 which fits into a corresponding groove 31 in an overlapping portion of the core, as best shown in Figure 1. The interfitting lip 30, and groove 31 of each connection extend parallel to the corresponding set of abutting faces 28 and 29 of the core and segments. Hence, the cooperating side faces 32 and 33 of the lips and the grooves, respectively, form wedging surfaces which are opposite in operative effect to the previously mentioned wedging surfaces. Accordingly, lateral displacement of the core 24 (to the right in Figures 3 and 4) is effective to contract the gate and pull the outer face 27 of at least one of the two segments 23 out of sealing engagement with its valve seat 14. It is obvious that other types of equivalent mechanical connections may provide the desired contracting effect. For example, dovetailed ribs and grooves (not shown) may directly connect the abutting faces of the segments and the core intermediate their ends.

Lateral displacement of the core 24 is accomplished by means of the T-head and under-cut groove structure, shown best in Figures 2 and 5. A lateral edge of the core has an endwise-extending groove 34 which is provided with overhanging walls 35, at both end portions thereof. One end of a lateral stub shaft 36 has an enlarged square or rectangular head 37, which fits the groove 34 for relative slideable movement therein as the core 24 is moved endwise during the opening and closing movements of the gate. The overhanging wall portions 35 are omitted centrally of the length of the groove 34 only for assembly purposes, i. e. so the head 37 may be inserted into and withdrawn therefrom. When the core 24, however, is at or adjacent to its upper or lower limit of travel, i. e. when the valve is in (or nearly in) open or closed position, the overhanging wall portions 35 prevent withdrawal of the head 37 out of the groove 34 so that lateral displacement of the shaft 36, in either direction, effects displacement of the core relative to the segments. The other end of the shaft 36 is threadedly received in a thimble 38, which latter is journalled in a side wall portion of the housing 10 and is provided with an operating handle 39. Axial displacement of the thimble 38 is prevented by an annular enlargement 40 which fits a corresponding annular recess 41 in the housing wall. A removable closure plate 42, which forms one side wall of the recess 41, permits insertion of the thimble into place. Suitable packing between the enlargement 40 and the walls of the annular recess 41 prevents leakage through the wall of the housing 10. If desired, a grease conduit 43 may open into the recess 41, in order to be able to introduce a suitable lubricant to the packing.

Because of the non-rotatable connection between the head 37 and the groove 34, rotation of the thimble 38, by the handle 39, positively moves the shaft 36 axially in either direction and laterally of the gate. The connection between the shaft 36 and the core 24 is such that the core may be displaced laterally by the shaft, whenever the gate is in (or nearly in) open or closed position. This connection, however, permits the core to move transversely of the shaft during endwise movement of the gate, between open and closed positions of the valve. Hence, turning the handle 39 is effective to positively expand or contract the gate to seal or unseal the valve. The amount of lateral displacement of the core necessary to expand or contract the gate the required amount is relatively small. Accordingly, the pitch of the threads connecting the shaft 36 to the thimble 38 may be so proportioned that only a quarter turn of the thimble is necessary to seal or unseal the valve. It will be noted that contraction of the gate by the handle 39 is controllable to limit the amount of clearance between the segments 23 and their seats 14. Hence, excessive escape of lubricant from the chamber 11 into the flow line may be prevented.

The gate is raised and lowered, that is, moved between open and closed positions, by the valve stem 20 which is connected to the core 24 by a T-head and slot construction. The lower end of the stem is provided with an enlarged head 44 which fits into an undercut slot 45 in one end of the core, thus preventing turning of the stem 20 upon rotation of the handwheel 21. Sufficient clearance is provided between the stem 20 and head 44 and the lateral sides of the slot 45 for lateral displacement of the core 24 with respect to the stem 20 during expansion and contraction of the gate. The slot 45, as shown in Figure 5, opens to one sideface 29 of the core in order to permit ready assembly of the connection. Thus, vertical movement of the valve stem 20 raises and lowers the core 24, which carries the segments 23 along as a unit because of the lip and groove connection therebetween, thereby opening or closing the valve. The stem 20 is provided with an annular shoulder or stop 46 having a conical portion which abuts against a conical seat in an upper portion of the wall of the chamber 11. This shoulder serves to limit the upward travel of the gate and also to properly align the gate ports 25 and 26 with the housing ports 12 and 13 in the open position of the valve. The lower end of the core 24 will abut the closure plate 17 and thereby limit the downward travel of the gate upon movement of the valve into closed position.

Operation of the valve is evident from the above description. Assuming the valve in the open and sealed position shown in Figures 1 and 3, and it is desired to close the valve. The handle 39 first is turned to contract the gate and unseal the valve, as shown in Figure 4. The handwheel 21 then is operated to move the gate into closed position, shown in Figure 2, whereupon the gate is expanded and the valve resealed by the operation of the handle 39.

Some of the basic features of the present invention may be retained in a gate construction having only two sections, as shown in Figure 6. In this modification, one section 47 is laterally displaceable and corresponds to an integration of the core 24 and one of the segments 23 of the previously described three section gate. The other section is like a segment 23 of a three section gate. Hence, the laterally displaceable section 47 has one wedging face 29 and one sealing face 27. To permit lateral movement of this section 47, the lateral guides 16, adjacent the valve seat 14 corresponding to the sealing face 27 of the section, are omitted. The operation of the two section gate structure is otherwise the same as that of the three section construction. Since an undesirable loaded wiping acion occurs, however, between the sealing faces of the laterally displaceable section 47 and its corresponding valve seat 14, this simplified structure finds its primary usefulness in a valve which is designed to handle pressure on one side only.

The invention has been shown as applied to a valve of the rising stem type, i. e. one in which the stem 20 is threaded to a handwheel 21 and fixed against rotation in the gate. The invention may be incorporated, however, in a valve of the non-rising stem type, i. e. one in which the stem is threaded into the gate and fixed to a handwheel to rotate therewith. In both types of valves, some relative lateral movement between the valve stem and the core 24, or laterally displaceable section 47, must be permitted. Since such relative movement is very slight, it may be provided for in a valve of the non-rising stem type by looseness in the threaded connection between the stem and the core. Provision for this relative lateral movement also may be made by the construction shown in Figures 7 and 8. In this construction, the core 24 is provided with a threaded bushing 48 which fits with lateral looseness in the core slot 45 in much the same manner as the head 44 on the stem of a rising stem type valve. The bushing 48 has a head 49 to engage the under side of the overhanging portions of the undercut slot 45 and an annular enlargement 50 to engage the top of the core. The valve stem 20 is threaded through the bushing and extends therebelow (in the open position of the valve) into a stem-receiving cavity, in the core body which forms an extension of the slot 45. The operation of this type of valve is the same as that of the rising-stem type.

It will be seen that this invention provides a greatly improved gate valve. The valve is readily operable in spite of pressure lock, and will handle pressure fluids from either side. Abrasive wear of the sealing surfaces is reduced to the minimum, thus permitting a wider choice of materials for such surfaces. Positive contraction of the gate is accomplished without the use of springs. The clearance between the sealing surfaces of the valve is controlled and adjustable in both fully open and fully closed positions. The valve is highly effective for use under adverse service conditions without leakage. Structural changes, however, which retain the basic features of the invention will be evident to one skilled in the art. Accordingly, the invention embraces all embodiments that come within the scope and spirit of the following claims.

I claim:

1. A gate valve comprising: a housing having aligned ports provided with opposed parallel valve seats; a sectional gate mounted for endwise rectilinear movement between said seats to open and close the valve, said gate including at least two abutting members, one of which has an outer face parallel to one of said seats for sealing engagement therewith and the other of which is displaceable laterally of said seats normal to the endwise movement of said gate and disposed between said one member and the other of said seats, the abutting faces of said members being parallel and inclined with respect to said seats to provide wedging surfaces effective to expand said gate normally of said seats and force said one member into sealing engagement with said one seat upon lateral displacement of said other member in one direction; guide means for maintaining said one member against displacement laterally of said seats normal to the movement of said gate; means connecting said members for simultaneous endwise movement; stem means for moving said gate endwise to open and close the valve; and means operable independently of said stem means for laterally displacing said other member.

2. A gate valve comprising: a housing having aligned ports provided with opposed parallel valve seats; a sectional gate mounted for endwise rectilinear movement between said seats to open and close the valve, said gate including at least two abutting members, one of which has an outer face parallel to one of said seats for sealing engagement therewith and the other of which is displaceable laterally of said seats normal to the endwise movement of said gate and disposed between said one member and the other of said seats, the abutting faces of said members being parallel and inclined with respect to said seats to provide wedging surfaces effective to expand said gate normally of said seats and force said one member into sealing engagement with said one seat upon lateral displacement of said other member in one direction; guide means for maintaining said one member against displacement laterally of said seats normal to the movement of said gate; interfitted means extending parallel to said abutting faces and connecting said members for relative lateral displacement therebetween and for simultaneous endwise movement, said means providing wedging surfaces effective to contract said gate normally of said seats upon lateral displacement of said other member in the other direction; stem means for moving said gate endwise to open and close the valve; and means operable independently of said stem means for laterally displacing said other member.

3. A gate valve comprising: a housing having aligned ports provided with opposed parallel valve seats; a sectional gate mounted for endwise rectilinear movement between said seats to open and close the valve, said gate including two members each having a face parallel to a corresponding valve seat for sealing engagement therewith and wedge means interposed between said members for lateral displacement normal to the endwise movement of said gate, lateral displacement of said wedge means in one direction being effective to expand said gate normally of said seats and forcefully seat said members oppositely against their respective seats; guide means for maintaining said members against displacement laterally of said seats normal to the movement of said gate; means connecting said wedge means and said members for simultaneous endwise movement; stem means for moving said gate endwise to open and close the valve; and means operable independently of said stem means for laterally displacing said wedge means.

4. A gate valve comprising: a housing having aligned ports provided with opposed parallel valve seats; a sectional gate mounted for endwise rectilinear movement between said seats to open and close the valve, said gate including two members each having a face parallel to a corresponding valve seat for sealing engagement therewith and wedge means interposed between said members for lateral displacement normal to the endwise movement of said gate, lateral displacement of said wedge means in one direction being effective to expand said gate normally of said seats and forcefully seat said members oppositely against their respective seats; guide means for maintaining said members against displacement laterally of said seats normal to the movement of said gate; interfitted means connecting each member to said wedge means for relative lateral displacement therebetween and for simultaneous endwise movement, said means providing wedging surfaces effective to contract the gate normally of said valve seats and forcefully unseat at least one of said members from its corresponding valve seat upon lateral displacement of said wedge means in the other direction; stem means for moving said gate endwise to open and close the valve; and means operable independently of said stem means for laterally displacing said wedge means.

5. A gate valve comprising: a housing having aligned ports provided with opposed parallel valve seats; a sectional gate mounted for endwise rectilinear movement between said seats to open and close the valve, said gate including two segments each having a face parallel to a corresponding valve seat for sealing engagement therewith and a core interposed between said segments for displacement laterally of said seats normal to the endwise movement of said gate, each set of abutting faces of said segments and said core being parallel and the two sets of said abutting faces being laterally divergent to provide two sets of wedging surfaces effective to expand said gate normally of said seats and forcefully seat said segments oppositely against their respective valve seats upon lateral displacement laterally of said seats normal to the movement of said gate of said core in one direction; guide means for maintaining said segments against lateral displacement; means connecting each of said segments to said core for simultaneous endwise movement;

end stem means connected to said core for moving said core and thereby said segments endwise to open and close the valve, the connection between said end stem and said core permitting relative lateral movement therebetween; and lateral stem means connected to said core for laterally displacing said core, the connection between said lateral stem and said core permitting relative movement therebetween parallel to the movement of said gate.

6. The structure defined by claim 5 in which the core has an undercut slot opening to one side in one end thereof and the end stem means has a head fitting with lateral clearance in said slot to permit said relative movement between said core and said end stem means.

7. The structure defined by claim 5 in which the core has a groove in a lateral edge thereof extending parallel to the movement of the gate, end portions of said groove being undercut, and the lateral stem means has a head fitting said groove to permit said relative movement between said core and said lateral stem means.

8. The structure defined by claim 5 in which the core and each segment are interconnected adjacent both ends thereof by a transversely interlocking rib and groove, each said rib and groove extending normal to the movement of the gate and parallel to the corresponding set of abutting faces, whereby lateral displacement of said core in the other direction is effective to contract the gate normally of the valve seats and forcefully unseat at least one of said segments from its corresponding valve seat.

9. A gate valve comprising: a housing having aligned ports provided with opposed parallel valve seats; a sectional gate mounted for endwise rectilinear movement between said seats to open and close the valve, said gate including a pair of ported segments having parallel outer sealing faces to engage said seats and laterally divergent inner faces and a ported core interposed between said segments for lateral displacement normal to the endwise movement of said gate, the segment ports and the core port being adapted to be aligned with said housing ports in the open position of the valve to permit unobstructed flow therethrough, said core having laterally divergent faces parallel to said segment inner faces to provide two sets of wedging surfaces effective to expand said gate normally of said seats and force said segments oppositely into sealing engagement with said seats upon lateral displacement of said core in one direction; guide means adjacent each of said seats for maintaining said segments against displacement laterally of said seats normal to the movement of said gate; means connecting each of said segments to said core for simultaneous endwise movement; stem means connected to one end of said core for moving said gate endwise to open and close the valve; and second stem means connected to a lateral edge of said core for laterally displacing said core.

10. A gate valve comprising: a housing having aligned ports provided with opposed parallel valve seats; a sectional gate mounted for endwise rectilinear movement between said seats to open and close the valve, said gate including two abutting members having parallel outer sealing faces to engage said seats and parallel opposed inner faces inclined with respect to said seats to provide wedging surfaces effective to expand said gate normally of said seats and forcefully seat said members oppositely against their respective valve seats upon relative displacement between said members in one direction laterally of said seats normal to the endwise movement of said gate; guide means for maintaining one of said members against lateral displacement, said other member being laterally displaceable; means connecting said members for simultaneous endwise movement; stem means for moving said gate endwise to open and close the valve; and means operable independently of said stem means for laterally displacing said other member.

11. The structure defined by claim 10 including interfitted means connecting the members for relative lateral displacement, said connection being effective to contract the gate normally of the valve seats and forcefully unseat at least one of said members from its corresponding valve seat upon lateral displacement of said other member in the other direction.

MILTON PAUL LAURENT.

REFERENCES CITED

The following references are of record in the file of this patent:

UNITED STATES PATENTS

| Number | Name | Date |
|---|---|---|
| 1,134,811 | Berger | Apr. 6, 1915 |
| 1,250,041 | Synder | Dec. 11, 1917 |
| 2,344,747 | Sperry | Mar. 21, 1944 |

FOREIGN PATENTS

| Number | Country | Date |
|---|---|---|
| 56,160 | Germany | of 1891 |
| 148,036 | Austria | Dec. 10, 1936 |

Certificate of Correction

Patent No. 2,537,470 January 9, 1951

MILTON PAUL LAURENT

It is hereby certified that error appears in the printed specification of the above numbered patent requiring correction as follows:

Column 4, line 47, for "dislacement" read *displacement*; column 6, line 42, for "acion" read *action*; column 8, lines 70 and 71, strike out "laterally of said seats normal to the movement of said gate" and insert the same in line 74, after the syllable "ment" and before the semicolon; line 73, strike out the word "lateral";

and that the said Letters Patent should be read as corrected above, so that the same may conform to the record of the case in the Patent Office.

Signed and sealed this 6th day of March, A. D. 1951.

[SEAL]

THOMAS F. MURPHY,
*Assistant Commissioner of Patents.*